_United States Patent_ [19]

Woodring et al.

[11] 4,351,418

[45] Sep. 28, 1982

[54] VEHICLE BRAKE COMPENSATOR

[75] Inventors: Cooper C. Woodring, Plandome; Philip A. Torbet, Port Washington, both of N.Y.

[73] Assignee: J.C. Penney Company, Inc., New York, N.Y.

[21] Appl. No.: 207,023

[22] Filed: Nov. 14, 1980

[51] Int. Cl.[3] ............................................... B62L 3/02
[52] U.S. Cl. ............................... 188/24.22; 74/501 R; 188/2 D
[58] Field of Search .......... 74/501 R; 188/2 D, 24.15, 188/24.16, 24.21, 24.22

[56] References Cited

U.S. PATENT DOCUMENTS 735,113 8/1903 Kelland et al. ................. 188/24.21

FOREIGN PATENT DOCUMENTS 714767 12/1941 Fed. Rep. of Germany ..... 188/2 D
286310 2/1953 Switzerland ..................... 188/2 D _Primary Examiner_—Duane A. Reger _Attorney, Agent, or Firm_—Daniel N. Calder

[57] ABSTRACT

A brake compensator for a vehicle using a resilient device or resilient elastomeric material which is connected to the cable or the cable sheath of a cable-controlled brake, and is extended or compressed in response to a force applied thereon when a brake is applied. In one embodiment, the resilient device is disposed between the sheath and the frame of a vehicle, and is arranged so that the control cable passes directly through the compensator and to a brake caliper. In a further embodiment, the brake compensator may be disposed between the sections of sheath around a continuous brake cable. This arrangement avoids the need for an assembly to mount the compensator to the vehicle frame. Apparatus is shown for pre-loading the resilient device and thereby advantageously adjusting for different product and rider characteristics. Additionally, structure may be provided for limiting the maximum compression, beyond which the cable and sheath operate in a conventional manner.

37 Claims, 7 Drawing Figures

VEHICLE BRAKE COMPENSATOR

BACKGROUND OF THE INVENTION

This invention relates generally to cable-controlled brakes for vehicles, and more particularly to a device which reduces the tendency of a wheel to lock in response to the application of a braking force.

Conventionally, bicycles are provided with right and left hand braking levers which operate the rear and front brakes, respectively, by means of cables. Minimum stopping distance is achieved when both such levers are operated simultaneously. The actuation of either lever independently of the other when it is necessary to stop quickly, may expose the operator to a less than acceptable stopping condition. In bicycles of the type having downward sweeping handlebars to reduce operator wind resistance, the operator is positioned on the bicycle so as to lean forward, thereby distributing a majority of the weight over the front wheel. Under these conditions and others described herein the rear wheel has very little stopping capability and could easily lock causing the bicycle to skid. Thus, the application of only the rear-wheel brake in an emergency situation may probably not bring the bicycle to a stop within a suitable distance.

Further, the application of only the front-wheel brake in an attempt to stop a bicycle in an emergency situation can produce a braking force which can cause the front wheel to reach a lockup threshold, sooner than under normal conditions. This could cause the bicycle to pivot forward about the hub of the front wheel.

One attempt to overcome the problems noted above is described in U.S. Pat. No. 4,057,127. This reference describes an apparatus which can permit the actuation of both front and rear brakes in tandem by operation of only one control lever. Moreover, actuation of the front brake is applied subsequent to the rear brake, the duration of delay being determined by an amount of time necessary to compress a spring, or to upset a lever arm.

It is, therefore, an object of this invention to improve bicycle braking systems so as to permit rapid deceleration and stopping, while reducing the potential tendency of bicycle to pivot about the front wheel hub and perhaps force the operator over the handlebars.

It is a further object of this invention to improve the tactile feedback available in operating the bicycle brake actuation levers.

It is another object of this invention to provide a bicycle braking system which controls the application of a braking force to a wheel without increasing the time period between the actuation of the brake lever and the application of the braking force at the wheel.

SUMMARY OF THE INVENTION

The foregoing and other objects are achieved by this invention which provides an apparatus for controlling the application of a braking force to a wheel of a vehicle, the apparatus being disposed in a vehicle braking system of the type which applies a braking force to a wheel in response to the actuation of a control lever. The braking force applied at the wheel is responsive to a tensile force which is applied to a cable by the control lever, and a reactive compressive force which is applied to a sheath surrounding the cable. A resilient device which has at least one dimension which varies in response to a force is disposed in the braking system so as to produce a dimensional displacement in response to either the tensile cable force, or the compressive force of the sheath. The effect of such displacement is to reduce the braking force provided at the wheel to a magnitude less than lockup threshold.

In one embodiment of the invention, the resilient device comprises a plurality of cup-shaped washers arranged in a back-to-back configuration disposed within a tubular housing which is affixed at one end to the frame of the bicycle. The other end of the tubular housing is configured so as to receive a proximal termination of the cable sheath. The distal portion of the sheath is mechanically connected in a conventional manner to a brake lever. The proximal portion of the sheath may be provided with a ferrule at the tip which enters the tubular housing, and which is disposed in an axial relationship with the resilient device. A washer-like member is provided so that the penetration of the sheath into the tubular housing will compressively displace the resilient device. The cable is connected at a distal portion to the manually operated calipers in a conventional manner. The cable is disposed within the sheath, runs through the resilient device and tubular housing, and is connected at the outer end to brake calipers in a conventional manner.

In operation, the application of a manual force so as to move the brake lever produces a tensile force in the cable which is counteracted by a compressive force in the sheath. In response to the compressive force, the sheath penetrates into the tubular housing, thereby compressing the resilient device. This operation reduces the rate of increase of the tension force on the cable with respect to the displacement of the brake lever, and in accordance with the force-displacement characteristic of the resilient device. The compression characteristic of the resilient device is advantageously selected so that the device will not begin to compress until after the brake pads have contacted the wheel, thereby providing several advantages. First, a rapid actuation of the brake lever which controls the brake of the front wheel, will not permit the wheel to lock. Additionally, the fork of the bicycle and other structural components are less stressed.

A further significant advantage resulting from this invention is more accurate control of bicycle deceleration. In conventional braking systems, pressure is applied to the brake lever, thereby displacing it until the pads of the associated brake caliper contact the wheel. Application of a further small amount of pressure will produce a slight further displacement of the brake lever, resulting from cable stretch and brake-pad compression. However, in a well adjusted brake system which employs high quality components, the application of further pressure at the brake lever will produce additional pressure between the brake-pads and the wheel, but will produce very little additional displacement of the lever. This invention improves the tactile feedback provided during the braking operation by providing an improved correlation between the pressure applied at the brake lever and its resulting displacement. Moreover, the resilient device absorbs the peaks and valleys which are present on the stress wave form of the cable and which result from irregularities and deformities in the wheel. Thus, the resilient device correctly and responsively compensates for peaks which could otherwise cause wheel lockup.

In a further embodiment of the invention, the force-displacement characteristic of the resilient device may be preselected to be non-linear and thereby provide an improved control range for normal slowing and stopping operations, and the capability to apply large mean braking forces without locking the wheel in emergency situations. Additionally, the resilient device may be provided with a compression limiter so as to permit conventional operation beyond a predetermined brake cable tension force.

In still further embodiments, the resilient device may be replaced by a spring having a helical spring configuration. Alternatively, a resilient material, illustratively elastomers, may be used. Moreover, the resilient device and its housing need not be affixed at one end to the frame of the bicycle. Both ends of the housing may be configured to engage respective portions of the sheath.

BRIEF DESCRIPTION OF THE DRAWINGS

Comprehension of the invention is facilitated by reading the following detailed description in conjunction with the annexed drawings in which.

DETAILED DESCRIPTION

Figure 1:
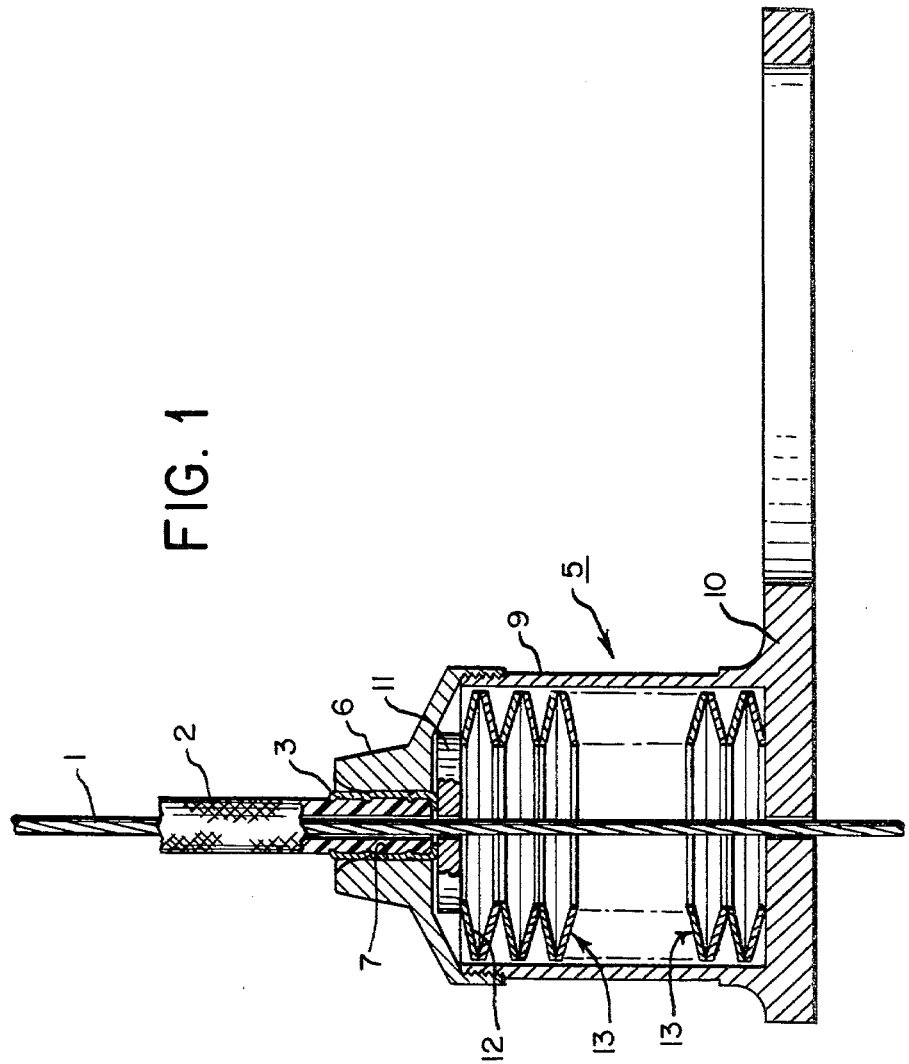
FIG. 1 is a cross-sectional representation of an embodiment of the invention which is coupled to a cable sheath at both ends.

FIG. 1 shows a bicycle brake cable 1 surrounded by a sheath 2. The sheath is terminated at a proximal end with a ferrule 3, which may be of a metallic material, for reducing wear and deformation of the proximal end of the sheath. The sheath is connected at a distal end to a brake lever, as will be described below with respect to FIG. 2. A shown in FIG. 1, sheath 2 engages compensator assembly 5 at an end portion 6 which is provided with a cylindrical opening 7 for slidably engaging ferrule 3.

In this embodiment of the invention, end portion 6 is threadedly engaged with a cylindrical housing 9. Cylindrical housing 9 is mechanically affixed to a base member 10. The mechanical engagement of cylindrical housing 9 to base member 10 and end portion 6 is not limited to the means shown and may be achieved by any suitable means, without departing from the scope of the claimed invention. Base member 10 is suitably and firmly affixed to the headset assembly of the bicycle, as will be discussed with respect to FIG. 2.

Ferrule 3 is in contact with a washer 11, which, in this embodiment, is in contact with a further cupped washer 12. Washers 11 and 12 are provided with openings at their centers so as to permit cable 1 to pass therethrough. Additionally, further washer 12 aligns with a resilient device 13 comprising a plurality of similarly shaped cup-shaped washers in a back-to-back configuration, i.e., a compression member.

Figure 2:
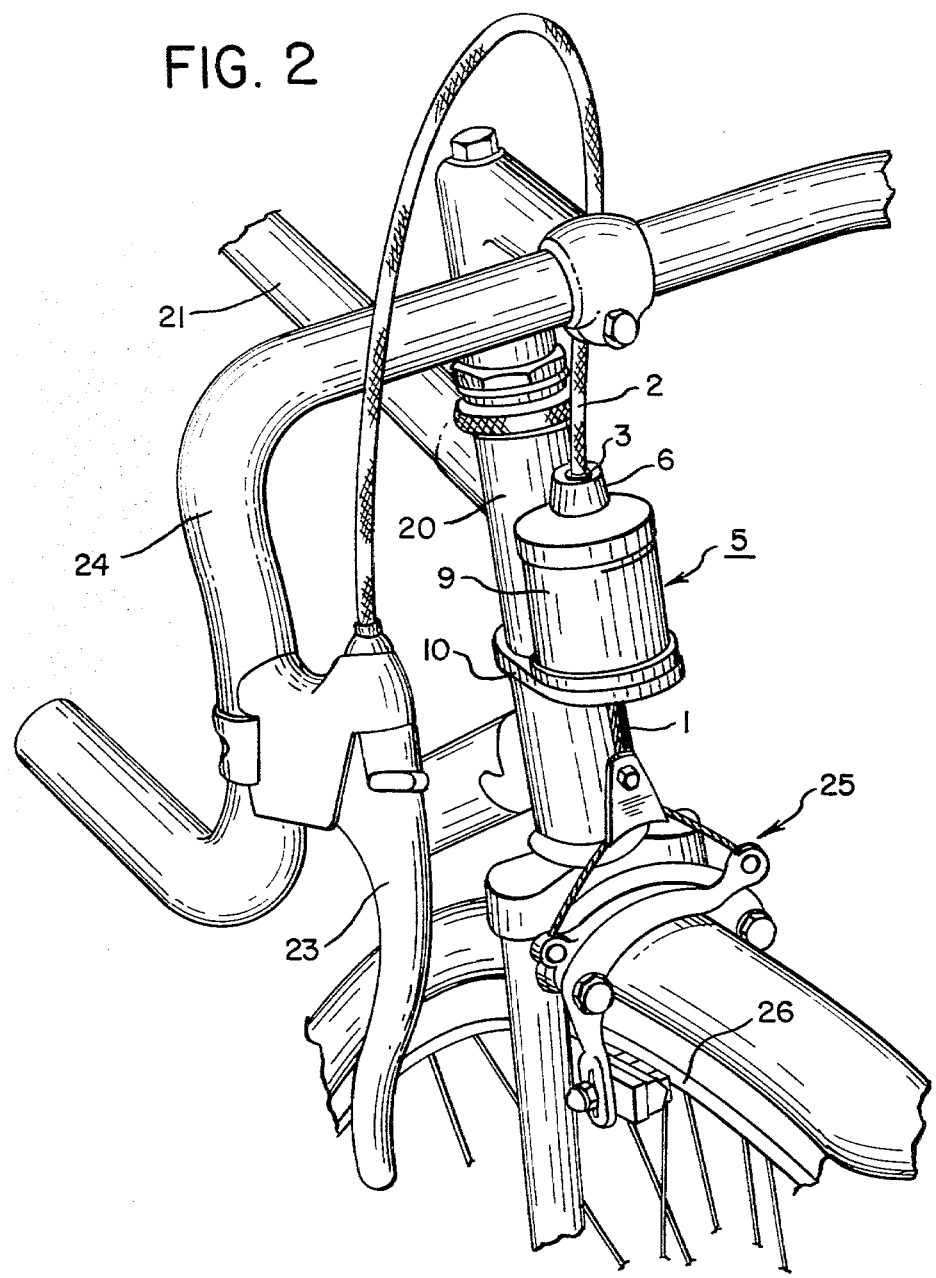
FIG. 2 shows the embodiment of FIG. 1 mounted on a bicycle.

FIG. 2 shows compensator assembly 5 mounted on a base member 10 which is mechanically affixed between headset assembly 20 and bicycle frame 21. Sheath 2 and cable 1 are connected in a conventional manner to brake lever 23 which is mounted on handlebars 24. FIG. 2 further shows cable 1 which passes through compensator assembly 5 and is connected to brake caliper 25. In this embodiment brake calipers 25 are of a conventional center-pull type.

In operation, actuation of brake lever 23 (not shown) causes a tensile force to be applied through brake cable 1. The tensile force is counteracted by a compressive force on sheath 2. As brake lever 23 is drawn closer to handle-bar 24, cable 1 is displaced upwardly so as to cause brake calipers 25 to contact bicycle wheel 26. Such closure causes a rapid increase in the magnitudes of tensile force on cable 1 and the compressive force on sheath 2, until the force on sheath 2 exceeds the compression threshold of resilient device 13. At that point, sheath 2 is forced into compensator assembly 5 and causes washers 11 and 12 to begin to compress resilient device 13. The compressive displacement of resilient device 13 causes a corresponding reduction in the rate of increase in the tensile force at cable 1, with respect to the displacement of cable 1. Resilient device 13 is configured so as to have a predetermined force-displacement characteristic such that it will not begin to compress until after brake caliper 25 has contacted bicycle wheel 26. The compressive displacement threshold of resilient device 13 may be advantageously preselected so that compression will not occur until after a predetermined stretching of cable 1 and compression of the sheath and the brake pads in brake caliper 25 have been achieved. Thus, at this point where deceleration would be controlled by the application of force at brake lever 23 without significant displacement of the lever, compensator assembly 5 permits additional displacement of the brake lever, thereby affording a greater measure of tactile feedback and control over the deceleration of the bicycle. In addition to the foregoing, the resiliency of resilient device 13 while in a partially compressed state absorbs peaks and valleys in the waveform of the tensile and compressive forces, which are present in cable 1 as a result of even minor deformities in wheel 26. This operation permits a greater range of mean braking force to be applied to bicycle wheel 26 by brake calipers 25 before the peaks in the waveform of the braking force exceed in magnitude the lock threshold of the wheel. The result is a substantial improvement in the oversensitivity of the brake system and reduction in stopping distance.

Figure 3:
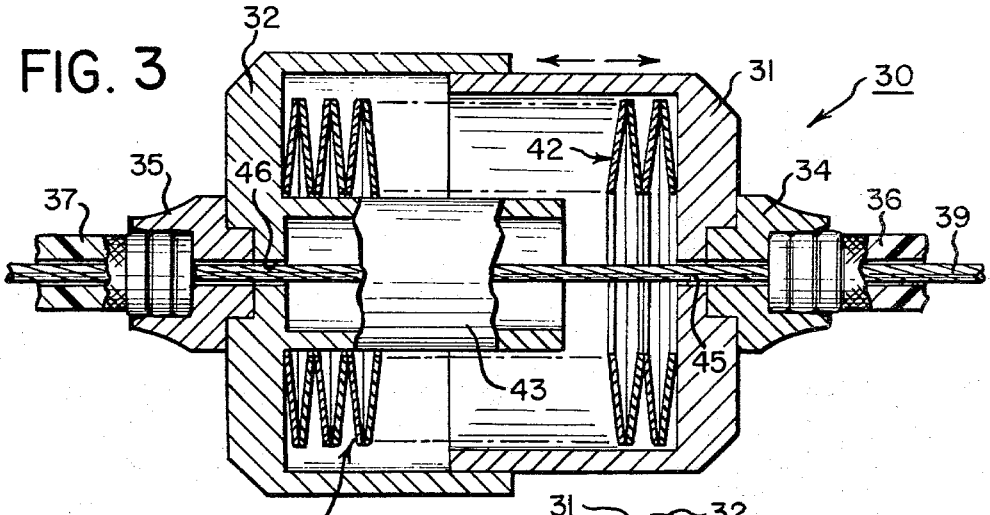
FIG. 3 is a cross-sectional representation of an embodiment of the invention which is coupled to a cable sheath at both ends.

FIG. 3 shows a double-ended compensator assembly 30 which is provided with two cup-like or cylindrical sections 31 and 32. Cylindrical section 31 is slidably engaged within cylindrical section 32. Each of these cylindrical sections is in mechanical engagement with a respective one of ferrules 34 and 35, which are associated with respective sheath portions 36 and 37. Cylindrical section 31 is slidably engaged within cylindrical section 32. Cylindrical sections 31 and 32 are provided with appropriate apertures 45 and 46 for permitting brake cable 39 to run directly through compensator assembly 30.

Figure 4:
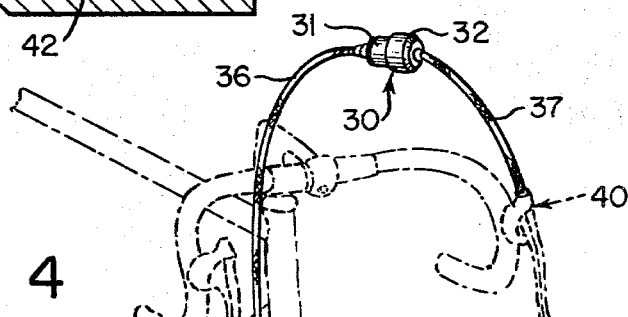
FIG. 4 shows an embodiment of the invention which is coupled to the cable sheath at both ends arranged on a bicycle.

FIG. 4 shows compensator 30 interposed between sheath sections 36 and 37, as described in FIG. 3. FIG. 4 further shows sheath portion 37, which covers cable 39 connected to brake lever 40 in a conventional manner. Sheath portion 36 and cable 39 are connected to brake caliper 41 in a conventional manner.

In this embodiment, brake caliper 41 is of a side-pull type. The application of a force on lever 39 will cause a compressive force to develop between sheath portions 36 and 37. As shown in FIG. 3, such a force would cause cylindrical section 31 to further engage into cylindrical section 32, thereby compressing resilient device 42. In this embodiment, resilient device 42 is comprised of a plurality of cup-shaped ring washers which are arranged back-to-back on a common central axis. Cylindrical section 32 is provided with an internal cylindrical protrusion 43 which maintains axial alignment among the washers. Such axial alignment is additionally maintained by cylindrical section 31 which has an internal diameter which closely corresponds to the outer diameter of the washers. It should be noted that the length of internal cylindrical protrusion 43 may be advantageously preselected to limit the maximum compression of the washers. Alternatively, the maximum compression may be controlled by advantageously preselecting the axial length of cylindrical section 31.

Figure 5:
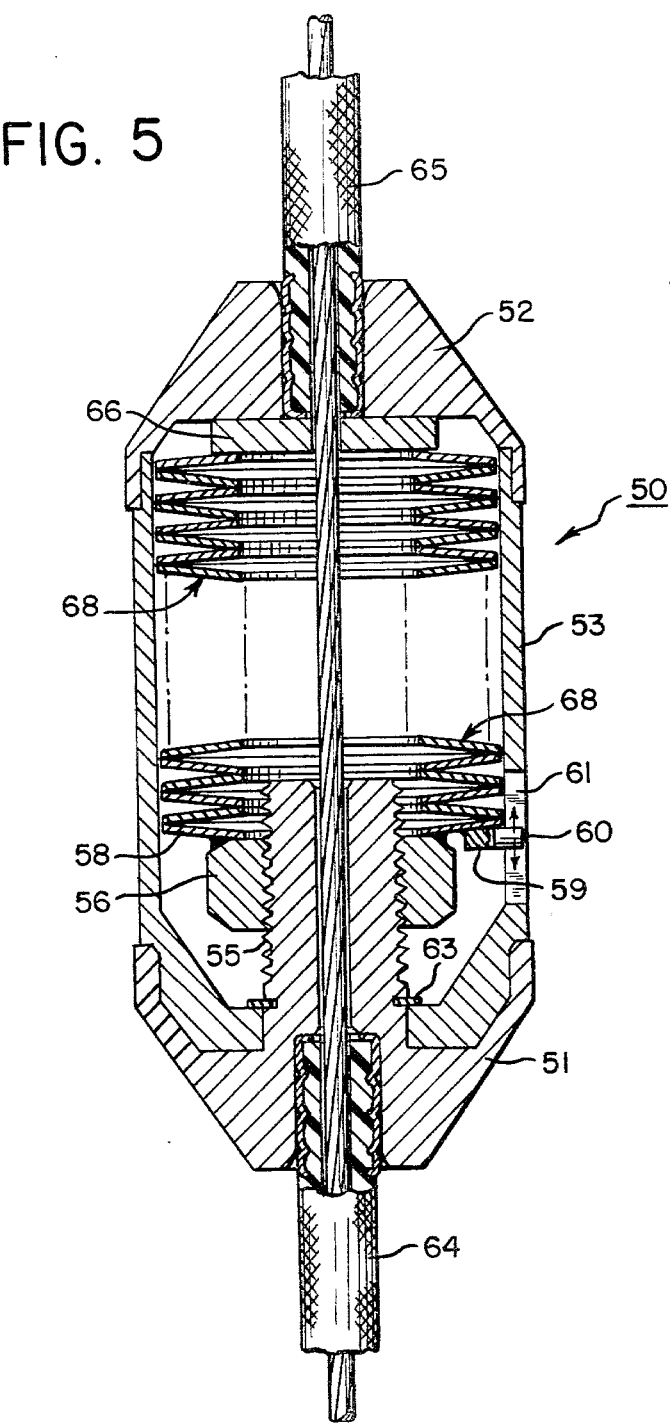
FIG. 5 shows an embodiment of the invention in which the resilient device has adjustable preloading.

FIG. 5 shows an embodiment of the invention having provisions for advantageously adjusting a pre-load force applied to the resilient device. Compensator assembly 50 is provided with a first end portion 51, a second end portion 52 and a cylindrical housing 53. First end portion 51 is provided with a threaded portion 55 which threadably engages a nut 56. Nut 56 is mechanically affixed, such as by a weld, to a washer 58. A retainer 59 is also mechanically affixed to washer 58, and has a portion 60 which slidably engages a slot 61 in cylindrical housing 53. First end portion 51 is prevented from slidably disengaging from cylindrical housing 53 by a snap ring 63.

As previously described, actuation of the brake lever causes a compressive force to be developed between sheath portions 64 and 65. In this embodiment, the compressive force causes sheath 65 to penetrate compensator assembly 50 and drive a washer 66 to compress resilient device 68. Resilient device 68 is shown as a plurality of cup-shaped ring washers which are preloaded by operation of nut 56 and washer 58. The preloading force is advantageously adjustable by rotating first end portion 51 with respect to cylindrical housing 53. Such rotation causes nut 56 to travel along thread portion 55. The nut 56 and washer 58 are prevented from rotating in the direction of first end portion 51 by operation of retainer 59 and its sliding portion 60. Thus, as first end portion 51 is rotated, retainer sliding portion 60 will be seen to move along slot 61. Such pre-loading will permit the compensator assembly to be adjusted to meet the specific characteristic of individual bicycles and riders, such as rider weight, brake pad derometer, rim style, hand brake lever mechanical advantage, cable friction, size of bicycle frame and so on. In some embodiments, it may be desirable to inscribe a weight scale on the surface of cylindrical housing 53 near slot 61 for which retainer sliding portion 60 would serve as an indicator.

Figure 6:
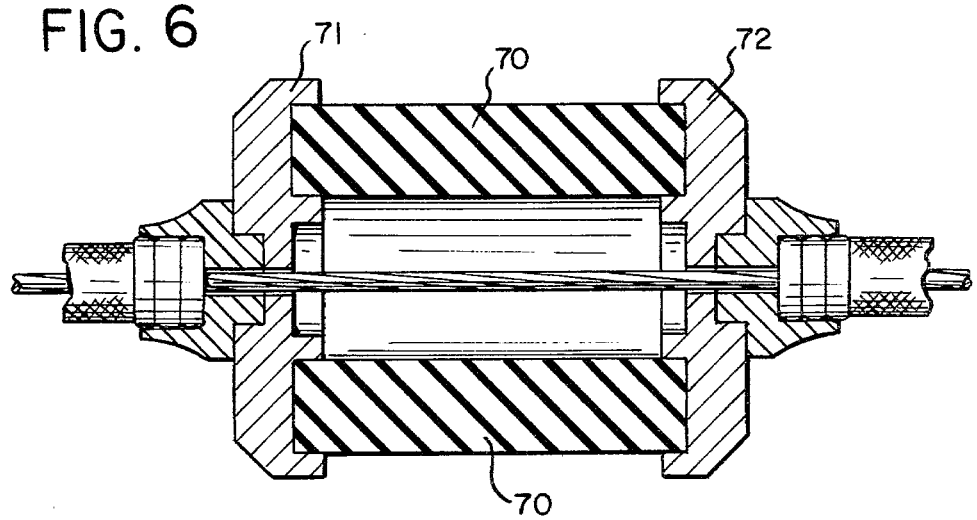
FIG. 6 shows an embodiment of the invention utilizing a resilient elastomeric material which is shown in a normal non-compressed state.
Figure 7:
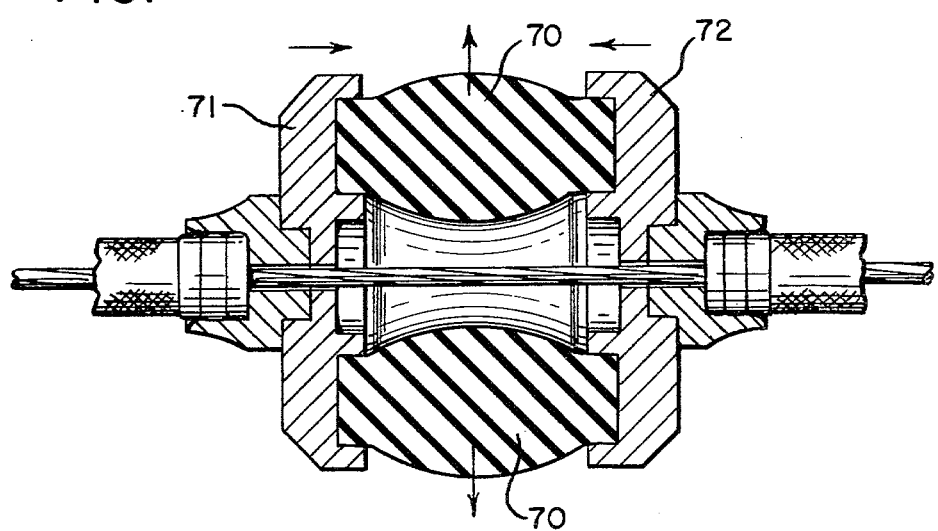
FIG. 7 is a schematic representation of the embodiment of FIG. 6 showing the elastomeric material in a compressed state.

The embodiment of FIGS. 6 and 7 are similar in operation to those previously described, but are provided with resilient elastomeric material in place of a plurality of cup-shaped washers. FIG. 6 shows a tubular length of elastomeric material 70 which is disposed between end sections 71 and 72. Elastomeric material 70 may be provided in a variety of densities and configurations, including hollow wall structures, so as to achieve desired force-displacement characteristics.

While the present invention has been described herein as comprising a resilient device of a plurality of aligned cup-shaped washers, it is nonetheless, anticipated by the present invention that the resilient device could effectively operate if a spring or spring like member, for example one or more helical springs, were substituted in lieu of the plurality of cup-shaped washers.

Although the inventive concept disclosed herein has been described in terms of specific embodiments and applications, other applications and embodiments will be obvious to persons skilled in the pertinent art without departing from the scope of the invention. The drawings and descriptions of specific embodiments of the invention in this disclosure are illustrative of applications of the invention and should not be construed to limit the scope thereof. In particular, the inventive concept of utilizing a resilient device or resilient elastomeric material to provide improved braking performance may be applied compressive or tensionally in view of this teaching to a cable-controlled brake system.

What is claimed is:

1. An apparatus for controlling the application of a braking force to a wheel of a vehicle, the apparatus being disposed in a vehicle braking system of the type having a braking member which applies the braking force in response to a displacement of an actuation member, the braking and actuation members communicating with one another by a cable which is disposed for at least a portion of its length within a sheath, the actuation member being of the type which transmits braking information to the braking member by applying a tensile force to the cable, which tensile force corresponds to a simultaneous compressive force applied to the sheath, the apparatus being characterized in that there is provided resilient means for producing a dimensional displacement in response to a compressive force, said dimensional displacement of said resilient means being in accordance with a predetermined force-displacement characteristic of said resilient means so as to reduce the braking force applied to the braking member in response to the displacement of the actuation member, said resilient means comprises a compression member having first and second ends and being circumferentially disposed about the cable.

2. The apparatus of claim 1 wherein there is further provided sheath coupling means for coupling the sheath to said resilient means, the compressive force applied to the sheath producing a responsive compressive dimensional displacement in said resilient means.

3. The apparatus of claim 2 wherein said resilient means has a non-linear force-displacement characteristic such that each additional increment of compressive force applied to the sheath produces less compressive dimensional displacement of said resilient means than a prior increment.

4. The apparatus of claim 2 wherein there is further provided compressive displacement limiting means for limiting the compressive dimensional displacement of said resilient means to a predetermined maximum.

5. The apparatus of claim 2 wherein there is further provided per-load means for preventing dimensional displacement of said resilient means until a predetermined minimum compressive force applied to the sheath is exceeded.

6. The apparatus of claim 1 wherein said compression member is comprised of a plurality of cup-shaped spring washers, said washers being axially aligned with respect to one another and disposed about the cable.

7. The apparatus of claim 1 wherein said compression member is comprised of elastomeric material in the form of a section of tube disposed about the cable.

8. The apparatus of claim 2 wherein said compression member is a spring which is helical in configuration.

9. The apparatus of claim 2 wherein said sheath coupling means comprises means for retaining the sheath in substantially axial alignment with said compression member, the sheath being coupled to said first end of said compression member so as to permit axial displacement of said sheath and said first end of said compression member with respect to said second end.

10. The apparatus of claim 9 further comprising mounting means for disposing the second end of said compression member in substantially fixed relationship to said vehicle.

11. The apparatus of claim 9 wherein said sheath coupling means comprises washer means circumferentially disposed about the cable.

12. The apparatus of claim 2 wherein said sheath coupling means comprises means for retaining the sheath in substantially axial alignment with said compression member, the sheath being in two spaced-apart portions, one portion of said sheath being coupled to the first compression member end and the other portion of said sheath being coupled to said second compression member end so as to permit axial displacement of the one portion of said sheath and said first compression member end with respect to the other portion of said sheath and said second compression member end.

13. The apparatus of claim 12 wherein said sheath coupling means comprises first and second cup-like sections with said first cup-like section slidably engaging said second cup-like section and said compression member housed therebetween.

14. The apparatus of claim 13 wherein said first cup-like section being internally dimensioned to maintain axial alignment with said compression member, and said second cup-like section having an axially extending, internal protrusion for maintaining axial alignment with said compression member.

15. The apparatus of claim 13 further comprising compressive displacement limiting means for limiting the compressive dimensional displacement of said compression member to a predetermined maximum.

16. The apparatus of claim 13 wherein said sheath coupling means further compresses first and second holding mean for retaining said first and second sheath portions respectively, said first and second holding means engaging said first and second cup-like sections respectively.

17. The apparatus of claim 12 wherein said compression member is comprised of a plurality of cup-shaped spring washers, said washers being axially aligned with respect to one another and disposed about the cable.

18. The apparatus of claim 2 wherein said sheath coupling means further comprises a pre-load means for preventing dimensional displacement of said resilient means until a pre-determined minimum compression force applied to the sheath is exceeded, said sheath being in two spaced-apart portions, one sheath portion being coupled to the first compression member end and the other sheath portion being coupled by said pre-load means to said second compression member end so as to permit displacement of the one sheath portion and said first compression member end with respect to the other sheath portion and said second compression member end.

19. The apparatus of claim 18 wherein said one sheath portion is coupled to said first compression member end by washer means which are circumferentially disposed about the cable.

20. The apparatus of claim 18 wherein said pre-load means comprises:
a member having an opening to receive said other sheath portion and having another opening permitting said cable to pass therethrough, said member having a portion extending therefrom in axial alignment with said received other sheath portion;
a contact means engaging the extending portion of said member and positionable there along, said contact means adapted for contacting said second compression member end from positions along said extending portion, the position of said contact means upon contacting said second compression member end being determinative of the pre-loading on said compressive member.

21. The apparatus of claim 20 wherein said member is rotatable, said extending portion and said contact means are threaded for threadable engagement and said pre-load means further comprises:
means for preventing said contact means from rotating when said member is being rotated, thereby rotation of said member causes said contact means to be threadably positioned along said extending portion.

22. The apparatus of claim 21 wherein said contact means comprises:
a nut threadably engaging said extending portion; and
a washer fixed to said nut for contacting said second compression member end.

23. The apparatus of claim 20 further comprising means for indicating the load to which said compression member is set.

24. The apparatus of claim 18 wherein said sheath coupling means further provides means for axial alignment of said two sheath portions with said compression member.

25. A two-wheeled vehicle comprising the apparatus of claim 1 in cooperation with at least one wheel thereof.

26. The vehicle of claim 25 wherein said vehicle is a bicycle.

27. A vehicle braking system for limiting braking force to a wheel to a magnitude less than lockup threshold comprising:
a braking member adapted for applying a braking force to a wheel upon activation thereof;
an activation member being displaceably operable and in communication with said braking member by a cable which extends therebetween, said cable being covered by a sheath for at least a portion of its length;
a brake compensator means having a predetermined force-displacement characteristic, said brake compensator means disposed between said braking member and said activation member, said compensator means comprising a compression member having first and second ends and being circumferentially disposed about the cable and coupled to said sheath;

upon displacement of said activation member a tensile force being applied to said cable and a simultaneous and corresponding compression force being applied to said sheath thereby displacing said cable and activating said braking member, furthermore, upon displacement of said activation means a force operates on said compensator means from said sheath producing a dimensional displacement of said compensator means in accordance with said predetermined force-displacement characteristic of said compensator means, which characteristic provides for a dimensional displacement of said compensator means which reduces the effective displacement of said cable thereby limiting the braking force to a magnitude less than that of lockup threshold.

28. The braking system of claim 27 wherein said compression member in a spring which is helical in form.

29. The braking system of claim 27 wherein said compression member is comprised of a plurality of cup-shaped spring-like washers which are axially aligned in a back-to-back relationship.

30. The braking system of claim 27 wherein said compression member is comprised of elastomeric material in the form of a section of tube disposed about the cable.

31. The braking system of claim 27 wherein said sheath is coupled by coupling means to said brake compensator means.

32. The braking system of claim 27 wherein the force-displacement characteristic of said brake compensator means is non-linear such that each additional increment of force applied to either said cable or said sheath produces less dimensional displacement of said brake compensator means than a prior increment.

33. The braking system of claim 27 further providing means for limiting to a predetermined maximum the dimensional displacement of said compensator means.

34. The braking system of claim 27 wherein there is further provided pre-load means for preventing dimensional displacement of said compensator means until a predetermined minimum force applied to either said sheath or said cable is exceeded.

35. A two-wheeled vehicle comprising the braking system of claim 25 in cooperation with at least one wheel thereof.

36. The vehicle of claim 35 wherein said vehicle is a bicycle.

37. The bicycle of claim 36 wherein said bicycle has downward sweeping handlebars.

* * * * *